(12) United States Patent
Yamada et al.

(10) Patent No.: US 6,637,406 B2
(45) Date of Patent: Oct. 28, 2003

(54) IN-CYLINDER INJECTION ENGINE WITH SUPERCHARGER

(75) Inventors: Tetsurou Yamada, Iwata (JP); Katsuhiko Kikuchi, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 108 days.

(21) Appl. No.: 09/681,909

(22) Filed: Jun. 25, 2001

(65) Prior Publication Data
US 2002/0014228 A1 Feb. 7, 2002

(51) Int. Cl.[7] .................................................. F02B 7/00
(52) U.S. Cl. ........................................ 123/431; 123/305
(58) Field of Search ................................. 123/431, 305, 123/299, 559.1

(56) References Cited

U.S. PATENT DOCUMENTS

| 3,154,059 | A |   | 10/1964 | Clark et al. |
| 5,063,886 | A |   | 11/1991 | Kanamaru et al. |
| 5,251,582 | A | * | 10/1993 | Mochizuki ................. 123/73 A |
| 5,291,865 | A | * | 3/1994  | Sasaki ........................ 123/298 |
| 5,313,920 | A | * | 5/1994  | Matsushita ................. 123/295 |
| 5,357,925 | A | * | 10/1994 | Sasaki ........................ 123/298 |
| 6,032,617 | A | * | 3/2000  | Willi et al. ............. 123/27 GE |

FOREIGN PATENT DOCUMENTS

| EP | 0 532 020 A1 | 3/1993 |
| JP | 60-30416 | 2/1985 |

* cited by examiner

Primary Examiner—John Kwon
(74) Attorney, Agent, or Firm—Ernest A Beutler

(57) ABSTRACT

A fuel injection system for an internal combustion engine, and particularly a supercharged one that employs both an in-cylinder injector and a manifold injector. By using two fuel injectors, one in-cylinder and one in the intake manifold, it is possible to operate under light loads with stratified charge and obtain a good homogenous mixture for combustion in other engine speed and load ranges.

18 Claims, 3 Drawing Sheets

IN-CYLINDER INJECTION ENGINE WITH SUPERCHARGER

BACKGROUND OF INVENTION

This invention relates to an internal combustion engine and particularly to a direct injected internal combustion engine provided with a supercharger.

It has been proposed to employ direct cylinder injection for internal combustion engines. By utilizing direct injection, it is possible to operate the engine more efficiently and also to obtain greater power and still improve the efficiency. This can be done by achieving a condition referred to as "stratification" in the engine under some running conditions, normally lower speed and lower load conditions.

As the performance of the engine is improved, however, it may be difficult for the direct injector to supply not only the minute quantities of fuel required under very low speed, low load conditions as well as the larger quantity of fuel necessary to obtain maximum power output. Although this can be done by providing injectors that have a higher capacity, then the ability to inject controlled small amounts of fuel under low load conditions becomes very difficult. Also, if the injection is set so as to provide adequate and carefully controlled small amounts of fuel, then fuel must be injected for a longer time period under high speed and high load conditions and this can result in unwanted exhaust gas constituents because of the fact that the fuel may not have had the time to vaporize before combustion starts.

These problems are particularly prevalent when the engine has its power increased through the use of a supercharger or pressure-forming device for introducing the charge into the combustion chamber at pressures greater than atmospheric.

It is, therefore, a principal object to this invention to provide an improved fuel injection system for a direct injected engine that permits accurate fuel control over a wide speed of engine load and speed ranges.

It is a further object to this invention to provide an improved fuel injection system for a supercharged internal combustion engine.

SUMMARY OF INVENTION

An internal combustion engine constructed in accordance with an embodiment of the invention is provided with a pair of relatively moveable components that define a combustion chamber, the volume of which varies cyclically during the engine operation. An induction system is provided for delivering an air charge to the combustion chamber. A first fuel injector is provided that injects fuel directly into the combustion chamber. A second fuel injector is provided for injecting fuel into an induction system that supplies an air charge to the combustion chamber. A control selectively controls the timing and duration of fuel injection from both of the fuel injectors.

In accordance with a further feature of the invention, the engine is provided with a supercharger which is mounted upstream of the second fuel injector.

DETAILED DESCRIPTION

Figure 1:
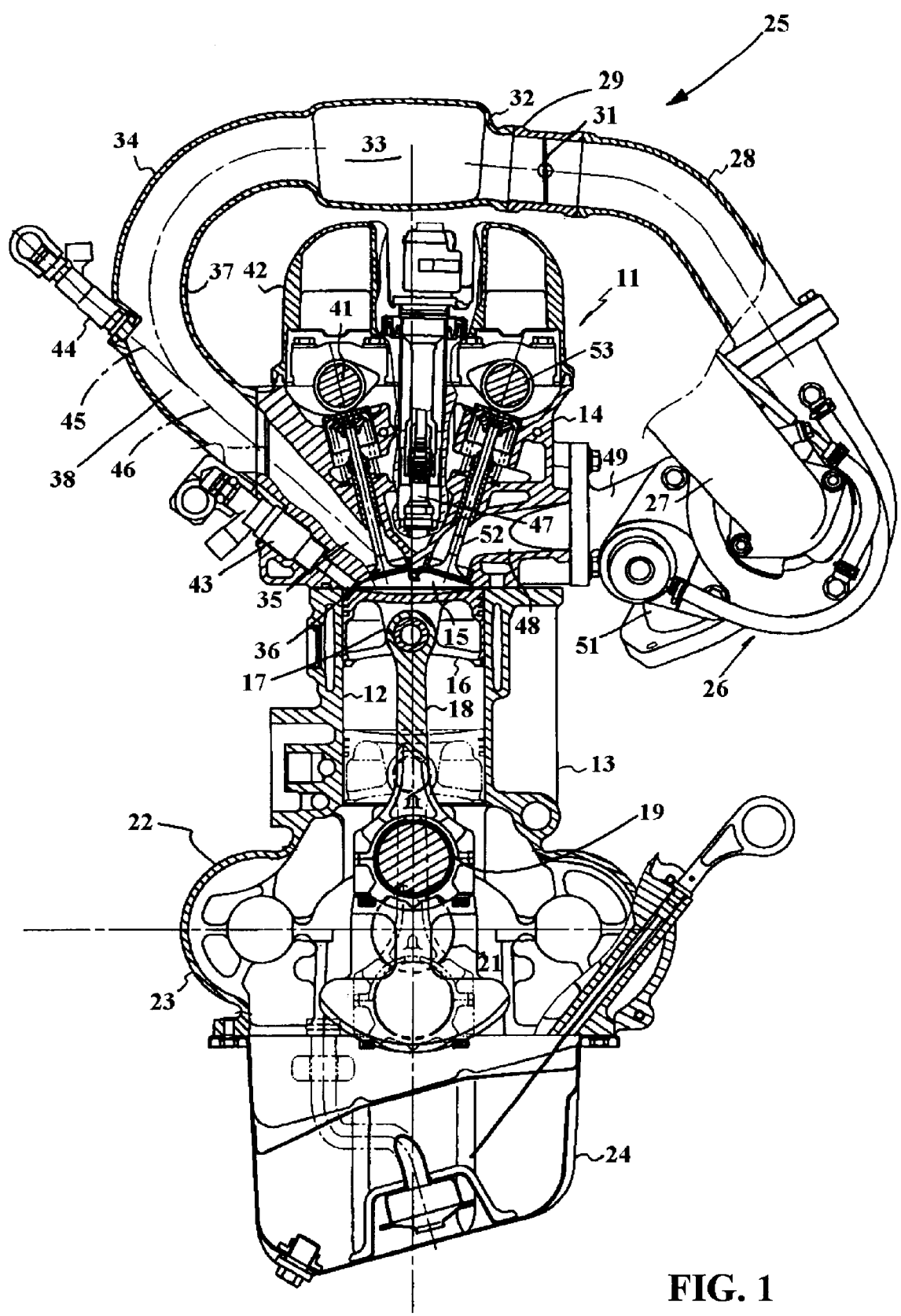
FIG. 1 is a cross sectional view taken through a single cylinder of an internal combustion engine constructed in accordance with an embodiment of the invention and showing the piston thereof at top dead center position in solid lines and at bottom dead center position in phantom lines.
Figure 2:
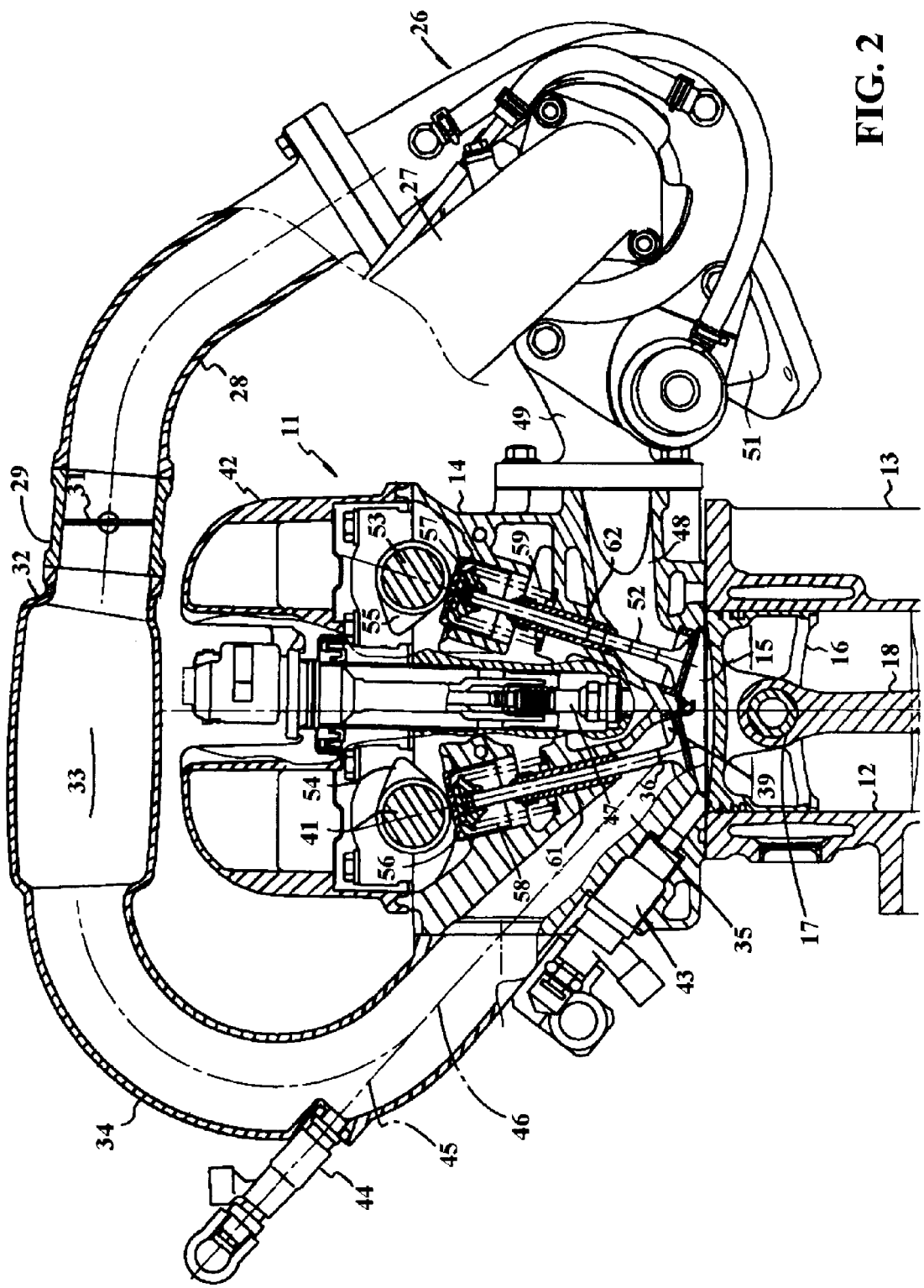
FIG. 2 is an enlarged cross sectional view, in part similar to FIG. 1, and shows primarily the upper end of the cylinder block and the cylinder head assembly.

Referring now in detail to the drawings and initially to FIGS. 1 and 2, an internal combustion engine constructed and operated in accordance with an embodiment of the invention is identified generally by the reference numeral 11. The engine 11 is shown only by reference to a cross section through a single cylinder of the engine 11 and specifically taken along the axis of a cylinder bore 12 formed in a cylinder block 13 of the engine. Although the invention is described in conjunction with only a single cylinder, it should be readily apparent to those skilled in the art how the invention may be employed with engines having various cylinder numbers and cylinder configurations.

The cylinder bore 12 is closed at its upper end by a cylinder head assembly 14 that is affixed to the cylinder block 13 in a known manner. The undersurface of the cylinder head assembly 14 is provided with one or more recesses 15 depending upon the number of cylinder bores 12. These recesses 15 cooperate with the cylinder bores 12 and the heads of pistons 16 that reciprocate therein to form the combustion chambers of the engine 11. As may be seen by the top dead center position shown in FIGS. 1 and 2, the cylinder head recess 15 forms the primary portion of the combustion chamber at top dead center and at times the reference numeral 15 will be referred to as the "combustion chamber".

The piston 16 is connected by a piston pin 17 to the small end of a connecting rod 18. The big end of the connecting rod 18 is journalled on a respective throw 19 of a crankshaft 21. The crankshaft 21 is rotatably journalled within a crankcase assembly that is formed by a skirt 22 of the cylinder block 13, a bearing cap member 23 and an oil pan 24, all of which are connected to each other in a suitable manner. The actual form of journaling for the crankshaft 21 can be of any desired type.

An induction system, indicated generally by the reference numeral 25 is provided for delivering an intake air charge to the combustion chambers 15. In accordance with a feature of the invention, the induction system 25 includes a supercharger 26, which is, in the preferred embodiment, a turbocharger. This supercharger 26 is provided with an inlet 27 that draws atmospheric air through a suitable air filter and silencing arrangement. The supercharged air is then discharged through a supply conduit 28 to a throttle body 29 in which a flow controlling throttle valve 31 is provided.

Downstream of the throttle valve 31, the throttle body 29 cooperates with an inlet 32 of a plenum chamber 33 which extends generally longitudinally of the engine above the cylinder head assembly 14.

Intake manifold runners 34 extend from the plenum chamber 33 to cylinder head intake passages 35, each of which communicate with a respective one of the cylinder head combustion chamber 15 through an intake valve 36. It will be seen that the manifold runners 34 have curved portions 37 that terminate in straight sections 38 which cooperate with the generally straight cylinder head intake passages 35 so as to provide a direct and unobstructed airflow into the combustion chamber 15.

The intake valves 36 cooperate with valve seats 39 formed in the cylinder head recesses 15 in an appropriate manner. The intake valves 36 are opened and closed by an intake camshaft 41 that is journalled in the cylinder head assembly 14 in a known manner, as will be described later, and which is contained within a cam cover 42 that is detachably affixed to the cylinder head assembly 14.

A first series of fuel injectors of the direct injection type, one of which appears in the drawings and is indicated by the reference numeral 43, are fixed in the cylinder head assembly 14 and have their discharge nozzles communicating with the combustion chamber 15 at one peripheral edge thereof. The fuel injectors 43 are supplied with fuel from a suitable fuel source and are controlled in a manner, which will be described hereinafter.

A second series of fuel injectors of the manifold type, indicated generally by the reference numeral 44, are mounted in the curved portions 37 of the intake manifold runners 34. As may be seen in these figures, a spray axis 45 of each of these second fuel injectors 44 is aligned with a flow axis 46 of the straight portion 38 of the intake passage formed by the runners 34 and the cylinder head intake passages 35. Thus, the fuel sprayed by the injectors 44 will be well mixed with the intake air and will not tend to impinge upon the walls of the intake passage.

Spark plugs 47 are mounted in the cylinder head assembly 14 and are disposed generally on the axis of the cylinder bores 12. These spark plugs 47 are fired by a suitable ignition system.

Exhaust passages 48 are formed in the cylinder head assembly 14 on the side opposite the intake passages 35. These exhaust passages terminate in openings that communicate with the turbine phase of the supercharger 26 through a suitable manifold arrangement 49. From the turbine of the supercharger 26 the exhaust gases exit through a flange 51, which communicates with a suitable, exhaust system.

Exhaust valves 52 are provided at the cylinder head recess surface end of the cylinder head exhaust passages 48. These exhaust valves 52 are operated by an exhaust camshaft 53, which is driven in a suitable manner along with the intake camshaft 41. Specifically, the intake and exhaust valves 36 and 52 are operated by respective lobes 54 and 55 (FIG. 2) of the intake and exhaust camshafts 41 and 53, which act upon thimble tappets 56 and 57, respectively, supported for reciprocation in the cylinder head assembly 14. These act against coil compression springs 58 and 59, respectively, which urge the valves 36 and 52 toward their closed positions within valve guides 61 and 62 formed in the cylinder head that support the stems of the intake and exhaust valves 36 and 52, respectively.

Figure 3:
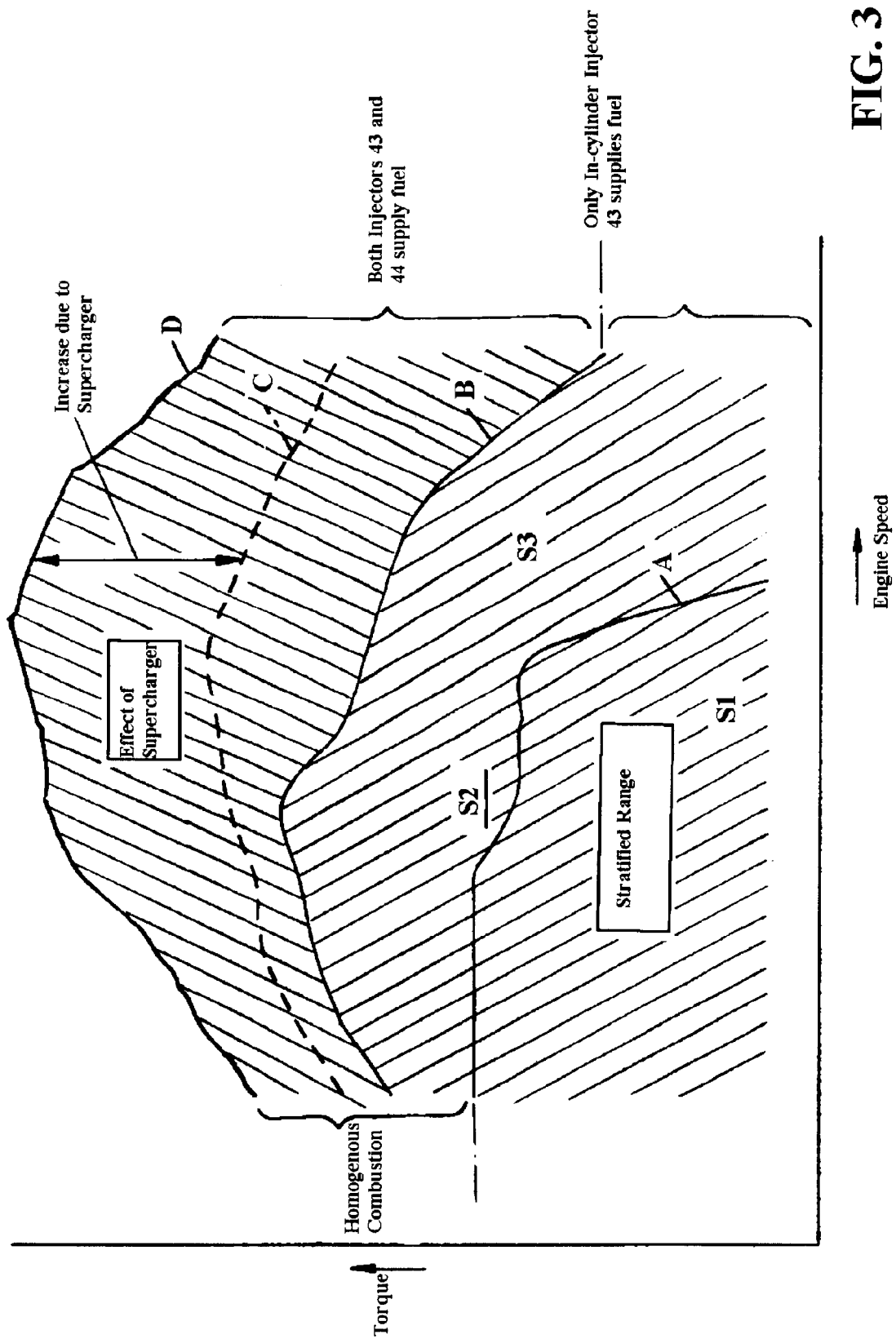
FIG. 3 is a graphical view showing the various ranges of engine speed, engine torque and the control arrangement and strategy in connection with the fuel injectors.

The control strategy by which the injectors 43 and 44 are operated will now be described by reference to FIG. 3. As seen in this figure, there is a curve, indicated by the reference character B which delineates the range when only the fuel injector 43 is employed from the range when both injectors 43 and 44 are employed to supply fuel. Within this range, there is a further range, indicated by the curve A under which the engine operates in a stratified charge mode. This area is indicated by the reference character S1. Under this condition the injector 43 only injects a small amount of fuel necessary to sustain engine operation. This fuel is injected toward the gap of the spark plug 47 and at a timing to insure that the charge will ignite even though the total charge in the combustion chamber 15 is less that stoichiometric.

Outside of the curve A and below the curve B in this figure, there are two ranges indicated as S2 and S3. In each of these ranges, the fuel is supplied only by the injector 43 but the engine is operated to provide homogeneous combustion.

Above the curve B, there is homogenous combustion and the mixture is supplied by the combination of the injectors 43 and 44. Since both injectors 43 and 44 are supplying fuel, it is possible to inject the necessary amount of fuel over the entire engine speed and low ranges. The disposition of the injector 44 in relation to the induction system flow passage, as previously noted, improves in the obtaining of the homogenous mixture.

In this portion of the curve, there is a broken line C which shows the torque which would be provided by the engine were it not for the supercharger 26. The curve D shows the actual output with the supercharger 26 operative so that the increase in torque between these two is indicated by the dimension as indicated.

Although the invention has been described in conjunction with an engine having a turbocharger, other forms of compressors can be employed including centrifugal or positive displacement type compressors. Also, some features of the invention may also be employed in un-supercharged engines. Of course, various other changes and modifications may be made without departing from the spirit and scope of the invention, as defined by the appended claims.

What is claimed is:

1. An internal combustion engine comprising a pair of relatively moveable components defining a combustion chamber of cyclically varying volume, an induction system for introducing an air charge into said combustion chamber, said induction system having a curved configuration at an intermediate part thereof and leading to a straight section communicating at its downstream end with said combustion chamber, a first fuel injector for injecting fuel directly into said combustion chamber, a second fuel injector for injecting fuel directly into said curved part of said induction system so that it spray axis is disposed centrally of said straight section for mixing with the air delivered to said combustion chamber, and a control for controlling the beginning and ending of injection of said fuel injectors.

2. An internal combustion engine as set forth in claim 1 wherein the control causes only one of the fuel injectors to inject fuel in a certain range of engine running conditions.

3. An internal combustion engine as set forth in claim 2 wherein the control causes only the first fuel injector to inject fuel in the certain range of engine running conditions.

4. An internal combustion engine as set forth in claim 3 wherein the certain range of engine running conditions comprises low speed, low load conditions.

5. An internal combustion engine as set forth in claim 4 wherein the control causes both of the fuel injectors to inject fuel in a certain other range of engine running conditions.

6. An internal combustion engine as set forth in claim 5 wherein the certain other range of engine running conditions comprises high speed, high load conditions.

7. An internal combustion engine as set forth in claim 1 wherein the control causes both of the fuel injectors to inject fuel in a certain range of engine running conditions.

8. An internal combustion engine as set forth in claim 7 wherein the certain range of engine running conditions comprises high speed, high load conditions.

9. An internal combustion engine as set forth in claim 1 wherein the induction system has a curved configuration at an intermediate part thereof and leading to a straight section communicating with the combustion chamber and the second fuel injector is mounted in the curved part so that it spray axis is disposed centrally of said straight section.

10. An internal combustion engine comprising a pair of relatively moveable components defining a combustion chamber of cyclically varying volume, an induction system comprised of a single induction passage for introducing an air charge into said combustion chamber, a first fuel injector for injecting fuel directly into said combustion chamber, a second fuel injector for injecting fuel directly into said induction system, a supercharger in said induction system upstream of said second fuel injector for pressurizing the air delivered to said combustion chamber and a control for controlling the beginning and ending of injection of said fuel injectors.

11. An internal combustion engine as set forth in claim 10 wherein the control causes only one of the fuel injectors to inject fuel in a certain range of engine running conditions.

12. An internal combustion engine as set forth in claim 11 wherein the control causes only the first fuel injector to inject fuel in die certain range of engine running conditions.

13. An internal combustion engine as set forth in claim 12 wherein the certain range of engine running conditions comprises low speed, low load conditions.

14. An internal combustion engine as set forth in claim 13 wherein the control causes both of the fuel injectors to inject fuel in a certain other range of engine running conditions.

15. An internal combustion engine as set forth in claim 14 wherein the certain other range of engine running conditions comprises high speed, high load conditions.

16. An internal combustion engine as set forth in claim 10 wherein the control causes both of the fuel injectors to inject fuel in a certain range of engine running conditions.

17. An internal combustion engine as set forth in claim 16 wherein the certain range of engine running conditions comprises high speed, high loud conditions.

18. An internal combustion engine as set forth in claim 10 wherein the induction system has a curved configuration at an intermediate part thereof and leading to a straight section communicating with the combustion chamber and the second fuel injector is mounted in the curved part so that it spray axis is disposed centrally of said straight section.

\* \* \* \* \*

UNITED STATES PATENT AND TRADEMARK OFFICE
CERTIFICATE OF CORRECTION

PATENT NO.     : 6,637,406 B2
DATED          : October 28, 2003
INVENTOR(S)    : Yamada et al.

It is certified that error appears in the above-identified patent and that said Letters Patent is hereby corrected as shown below:

Columns 4-6,
Claims 9-18, should be deleted and replaced by claims 9-17, reading as follows:

9. An internal combustion engine as set forth in claim 1 further including comprising a pair of relatively moveable components defining a combustion chamber of cyclically varying volume, an induction system comprised of a single induction passage for introducing an air charge into said combustion chamber, a first fuel injector for injecting fuel directly into said combustion chamber, a second fuel injector for injecting fuel directly into said induction system, a supercharger in the said induction system upstream of the said second fuel injector for pressurizing the air delivered to the said combustion chamber and a control for controlling the beginning and ending of injection of said fuel injectors.

10. An internal combustion engine as set forth in claim 9 wherein the control causes only one of the fuel injectors to inject fuel in a certain range of engine running conditions.
11. An internal combustion engine as set forth in claim 10 wherein the control causes only the first fuel injector to inject fuel in the certain range of engine running conditions.
12. An internal combustion engine as set forth in claim 11 wherein the certain range of engine running conditions comprises low speed, low load conditions.
13. An internal combustion engine as set forth in claim 12 wherein the control causes both of the fuel injectors to inject fuel in a certain other range of engine running conditions.
14. An internal combustion engine as set forth in claim 13 wherein the certain other range of engine running conditions comprises high speed, high load conditions.

15. An internal combustion engine as set forth in claim 9 wherein the control causes both of the fuel injectors to inject fuel in a certain range of engine running conditions.
16. An internal combustion engine as set forth in claim 15 wherein the certain range of engine running conditions comprises high speed, high load conditions.
17. An internal combustion engine as set forth in claim 9 wherein the induction system has a curved configuration at an intermediate part thereof and leading to a straight section communicating with the combustion chamber and the second fuel injector is mounted in the curved part so that it spray axis is disposed centrally of said straight section.

Signed and Sealed this

Twenty-fourth Day of August, 2004

JON W. DUDAS
*Director of the United States Patent and Trademark Office*